(12) United States Patent
Kim et al.

(10) Patent No.: US 6,930,508 B2
(45) Date of Patent: Aug. 16, 2005

(54) INTEGRATED CIRCUIT WITH ON-CHIP TERMINATION

(75) Inventors: Nam-Seog Kim, Seoul (KR); Uk-Rae Cho, Suwon-shi (KR); Tae-Hyoung Kim, Sungnam-shi (KR)

(73) Assignee: Samsung Electronics Co., Ltd., Suwon-Shi (KR)

( * ) Notice: Subject to any disclaimer, the term of this patent is extended or adjusted under 35 U.S.C. 154(b) by 40 days.

(21) Appl. No.: 10/626,015

(22) Filed: Jul. 24, 2003

(65) Prior Publication Data

US 2004/0145393 A1 Jul. 29, 2004

(30) Foreign Application Priority Data

Jul. 29, 2002 (KR) .............................. 10-2002-0044636

(51) Int. Cl.$^7$ ........................................... H03K 19/003
(52) U.S. Cl. ......................................... 326/30; 326/86
(58) Field of Search ............................ 326/30, 82–83, 326/86–87, 59–60; 327/108

(56) References Cited

U.S. PATENT DOCUMENTS

| | | | | |
|---|---|---|---|---|
| 5,602,494 A | * | 2/1997 | Sundstrom | 326/39 |
| 6,316,957 B1 | | 11/2001 | Ang et al. | 326/30 |
| 6,642,740 B2 | * | 11/2003 | Kim et al. | 326/30 |
| 6,690,191 B2 | * | 2/2004 | Wu et al. | 326/30 |

* cited by examiner

*Primary Examiner*—James H. Cho
(74) *Attorney, Agent, or Firm*—F. Chau & Associates, LLC

(57) ABSTRACT

There is provided an integrated circuit which performs data input/output operations through a transmission line with a predetermined impedance. The integrated circuit includes a driver having a plurality of driving units, in which the driving units input/output data from/to the transmission line, and a controller for inputting an output data signal and applying a plurality of control signals to the driver, in which the control signals are generated in response to an output activation signal and impedance code signals related to states of the impedance. At least one driving unit is driven in response to the control signals, and the driver includes an on-chip termination circuit connected to an input buffer.

17 Claims, 13 Drawing Sheets

INTEGRATED CIRCUIT WITH ON-CHIP TERMINATION

BACKGROUND OF THE INVENTION

1. Field of the Invention

The present invention relates to an integrated circuit driver, and more particularly, to an integrated circuit driver with on-chip termination.

2. Description of the Related Art

In designing integrated circuits (IC) that process digital signals or data, circuit designers must account for losses or degradation of signals due to intended or unintended simultaneous operations among peripheral circuits and devices, such as signal distortion, signal reflection or power consumption. Data communications between integrated circuits or peripheral circuits can be degraded due to load capacitance and impedance mismatch that exist in transmission lines. Typically, matching devices or circuits are used for matching the impedance between internal circuits and external circuits, particularly for driver circuits which outputs signals or data from one IC to another IC chip. In general, a termination circuit for matching characteristic impedance and controlling electrical load are provided in order to prevent signal reflection or line reflection from occurring in transmission lines to which output circuits and peripheral circuits are connected. Resistors are typically used as a termination device. By connecting resistors to the transmission line, the characteristic impedance of the transmission line can be matched and the signal reflection and discontinuity problem can be attenuated.

Integrated circuits having on-chip termination devices are known. In designing interfaces requiring on-chip termination, terminals (or input/output ports) should include both a driver and an on-chip termination circuit for bi-directional (input and output) signal transmissions. However, since such design construction result in an increase of circuit area and load capacitance of the interface structure, there is a need to include the on-chip termination within the driver. Further, since the impedance of input and output devices of an integrated circuit and external transmission line is sensitive and can vary due to process, voltage or temperature variations, there is a need for efficient and flexible impedance control based on desired impedance states.

SUMMARY OF THE INVENTION

Accordingly, the present invention is directed to an integrated circuit with on-chip termination that substantially obviates one or more problems due to limitations and disadvantages of the related art.

One aspect of the present invention is to provide an integrated circuit having a driver with on-chip termination, in which linearity is improved and impedance is constantly maintained.

Another aspect of the present invention is to provide an integrated circuit having a driver which performs on-chip termination through substantial and efficient control.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In an aspect of the present invention, there is provided an integrated circuit connected to a transmission line having a predetermined impedance, comprising: a driver including a plurality of driving units, in which the driving units input/output data from/to the transmission line; and a controller for inputting an output data signal and applying a plurality of control signals to the driver, in which the control signals are generated in response to an output activation signal and impedance code signals related to states of the impedance, wherein at least one driving unit is driven in response to the control signals, and the driver includes an on-chip termination circuit connected to an input buffer.

The driver includes a first driving unit and a second driving unit, which are commonly connected to the transmission line. The controller includes: circuit for generating a first up driving control signal in response to the output activation signal and the output data signal; circuit for generating a second up driving control signal in response to the output activation signal and the output data signal; circuit for generating a first down driving control signal in response to the output activation signal and the output data signal; circuit for generating a second down driving control signal in response to the output activation signal and the output data signal; circuit for generating a third up driving control signal in response to the output activation signal, the output data signal and a first impedance code signal; circuit for generating a fourth up driving control signal in response to the output activation signal, the output data signal, the first impedance code signal and a second impedance code signal; circuit for generating a third down driving control signal in response to the output activation signal, the output data signal and the first impedance code signal; and circuit for generating a fourth down driving control signal in response to the output activation signal, the output data signal, the first impedance code signal and the second impedance code signal.

The first driving unit includes: a first up driver for connecting a power supply voltage with the transmission line in response to the first up driving control signal; a second up driver for connecting the power supply voltage with the transmission line in response to the second up driving control signal; a first down driver for connecting the transmission line with a ground voltage in response to the first down driving control signal; and a second down driver for connecting the transmission line with the ground voltage in response to the first down driving control signal.

The second up driver and the second down driver are contained in the on-chip termination circuit. The first up driver and the first down driver are selectively driven according to kinds of the output data signals at a data output operation, and the second up driver and the second down driver are simultaneously driven at a data input operation.

The second driving unit includes: a third up driver for connecting the power supply voltage with the transmission line in response to the third up driving control signal; a fourth up driver for connecting the power supply voltage with the transmission line in response to the fourth up driving control signal; a third down driver for connecting the transmission line and the ground voltage in response to the third down driving control signal; and a fourth down driver for connecting the transmission line with the ground voltage in response to the fourth down driving control signal.

The fourth up driver and the fourth down driver are contained in the on-chip termination circuit. In order to compensate for the impedance, the third up driver and the third down driver are selectively driven simultaneously together with the first up driver and the first down driver according to kinds of the output data signals at the data output operation, and the fourth up driver and the fourth down driver are driven simultaneously together with the second up driver and the second down driver at the data input operation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. However, the present invention is not limited to the embodiments illustrated hereinafter, and the embodiments herein are rather introduced to provide easy and complete understanding of the scope and spirit of the present invention.

Figure 1:
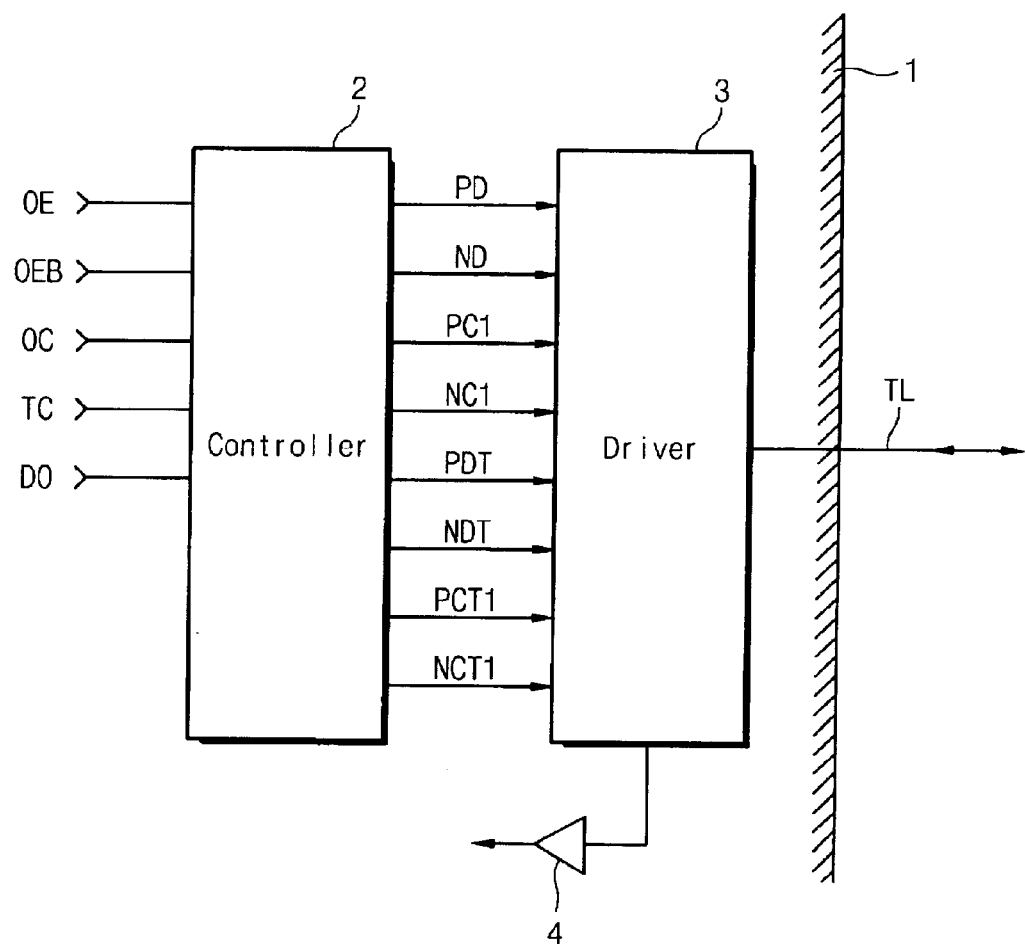
FIG. 1 is a block diagram showing an arrangement of an input driver and a controller of an integrated circuit in accordance with the present invention.

FIG. 1 is a block diagram showing an arrangement of a controller 2 and a driver 3, which are installed in an integrated circuit 1 in accordance with the present invention.

Referring to FIG. 1, the controller 2 receives data DO and control signals OE/OEB, OC and TC and provides the driver 3 with driving control signals PD, PC1, PDT, PCT1, ND, NC1, NDT and NCT1 (hereinafter, referred to as "PD to NCT1"). The driver 3 provides an output ("1" or "0") corresponding to the data DO to peripheral devices via a transmission line TL connected with an exterior of the integrated circuit 1. The driver 3 provides the output to the transmission line TL in response to the driving control signals PD to NCT1, and includes up drivers and down drivers for required impedance matching. Additionally, the driver 3 includes a termination circuit for impedance matching data inputted into the peripheral devices. Data inputted from the external circuits via the transmission line TL are provided to internal circuits of the integrated circuit 1 through the driver 3 and a buffer 4.

Integrated circuit devices to which the above structure can be applied are digital data signal processing devices fabricated using semiconductor manufacturing technology, including devices requiring electrical impedance matching to peripheral devices, e.g., memory devices or signal processors.

Figure 2:
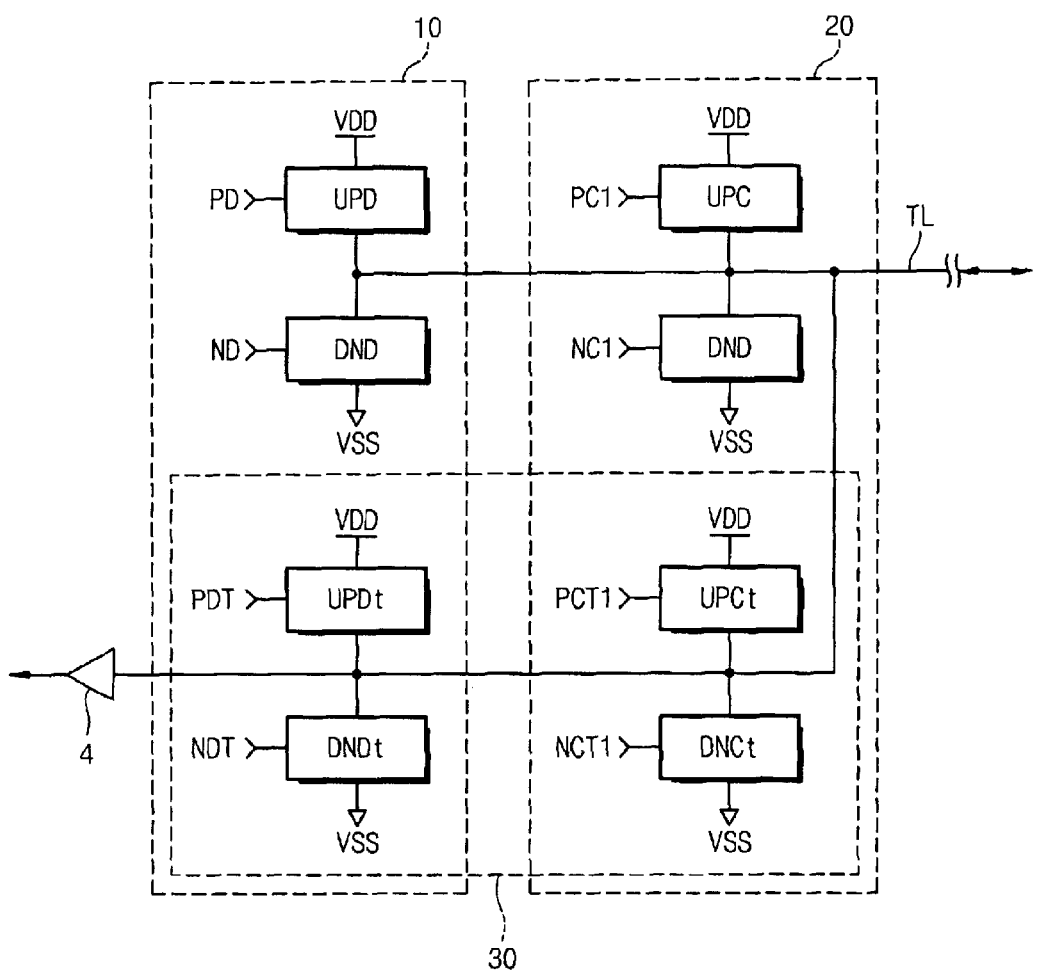
FIG. 2 is a block diagram showing an internal configuration of the driver of FIG. 1.

FIG. 2 is a block diagram of an internal configuration of the driver 3 shown in FIG. 1. Referring to FIG. 2, the driver 3 of the present invention includes a first driving unit 10 and a second driving unit 20. Structures of the first driving unit 10 and the second driving unit 20 are the same, except different driving control signals may be applied thereto. The second driving unit 20 makes compensation for the impedance of the first driving unit 10 when data "1" or "0" is outputted to the transmission line TL.

The first driving unit 10 includes two up drivers UPD and UPDt and two down drivers DND and DNDt. Likewise, the second driving unit 20 includes two up drivers UPC and UPCt and two down drivers DNC and DNCt. The up drivers UPD, UPC, UPDt and UPCt are designed to be simultaneously driven when a data "1" is outputted to the transmission line TL. Additionally, the down drivers DND, DNC, DNDt and DNCt are designed to be simultaneously driven when data "0" is outputted to the transmission line TL. Meanwhile, the up drivers UPDt and UPCt and the down drivers DNDt and DNCt are simultaneously driven when the integrated circuit 1 receives data via the transmission line TL, thereby constituting a termination circuit 30 for impedance matching to devices external to the integrated circuit 1. External data are provided to the internal circuits of the integrated circuit 1 through the termination circuit 30 and the buffer 4.

In the first driving unit 10, the up driver UPD is connected between a power supply voltage VDD and the transmission line TL and outputs data "1" to the transmission line TL in response to the up driving control signal PD. The down driver DND is connected between the transmission line TL and a ground voltage VSS and outputs data "0" in response to the down driving control signal ND. In the second driving unit 20, the up driver UPC is connected between the power supply voltage VDD and the transmission line TL and outputs data "1" to the transmission line TL in response to the up driving control signal PC1. The down driver DNC is connected between the transmission line TL and the ground voltage VSS and outputs data "0" in response to the driving control signal NC1.

The up driver UPDt contained in the first driving unit 10 and also functionally contained in the termination circuit 30 is connected between the power supply voltage VDD and the transmission line TL. In response to the up driving control signal PDT, the up driver UPDt becomes conductive when data "1" is outputted to the transmission line TL or when data is inputted via the transmission line TL. The down driver DNDt contained in the first driving unit 10 and also functionally contained in the termination circuit 30 is connected between the transmission line TL and the ground voltage VSS. In response to the down driving control signal NDT, the down driver DNDt becomes conductive when data "0" is outputted to the transmission line TL or when data is inputted via the transmission line TL.

The up driver UPCt contained in the second driving unit 20 and also functionally contained in the termination circuit 30 is connected between the power supply voltage VDD and the transmission line TL. In response to the up driving control signal PCT1, the up driver UPCt becomes conductive when data "1" is outputted to the transmission line TL or when data is inputted via the transmission line TL. The down driver DNCt contained in the second driving unit 20 and also functionally contained in the termination circuit 30 is connected between the transmission line TL and the ground voltage VSS. In response to the down driving control signal NCT1, the down driver DNCt becomes conductive when data "0" is outputted to the transmission line TL or when data is inputted via the transmission line TL.

Although only the first driving unit 10 and the second driving unit 20 are shown in FIG. 2, it is noted that structures of the second driving unit 20 can be further added to the embodiment of the present invention according to impedance state and capacitance related to the transmission line TL.

Figure 3:
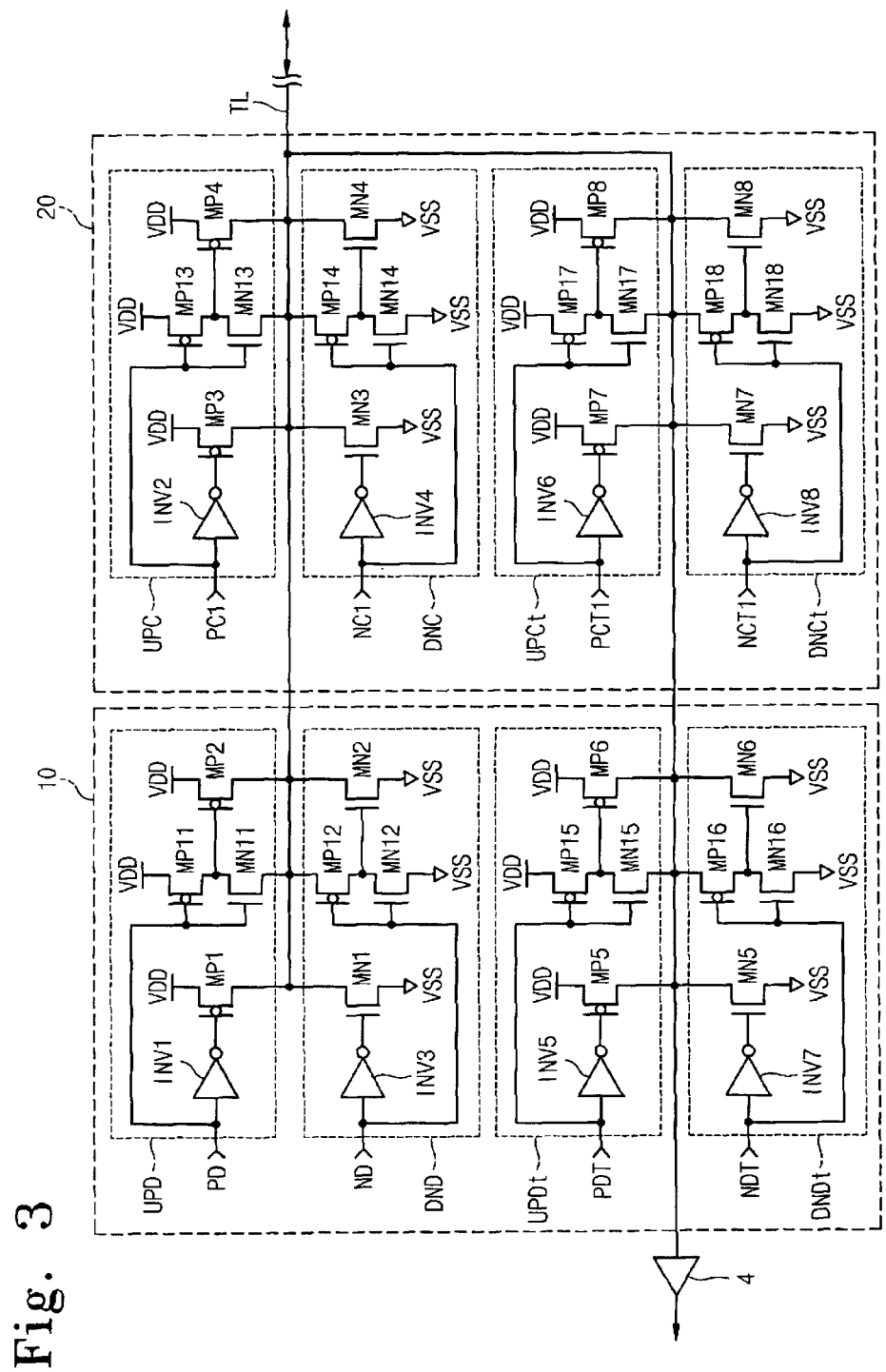
FIG. 3 is a circuit diagram of the up drivers and the down drivers shown in FIG. 2.

FIG. 3 is a circuit diagram of the up drivers and the down drivers shown in FIG. 2. The structure is the same for each of the up drivers UPD, UPC, UPDt and UPCt, except for the up driving control signals applied thereto. Additionally, the structure is the same for each of the down drivers DND, DNC, DNDt and DNCt, except for the down driving control signals applied thereto.

Referring to FIG. 3, the up driver UPD of the first driving unit 10 is implemented with PMOS transistors MP1, MP2 and MP11 and an NMOS transistor MN11. The up driving control signal PD is connected through an inverter INV1 to a gate of the PMOS transistor MP1 which is connected between the power supply voltage VDD and the transmission line TL. Also, the up driving control signal PD is commonly connected to gates of the PMOS transistor MP11 and the NMOS transistor MN11, which are connected in series between the power supply voltage VDD and the transmission line TL. A common drain node of the PMOS transistor MP11 and the NMOS transistor MN11 is connected to a gate of the PMOS transistor MP2 which is connected between the power supply voltage VDD and the transmission line TL. The down driver DND is implemented with a PMOS transistor MP12 and NMOS transistors MN1, MN2 and MN12. The down driving control signal ND is connected through an inverter INV3 to a gate of the NMOS transistor MN1 which is connected between the transmission line TL and the ground voltage VSS. Also, the down driving control signal ND is commonly connected to gates of the PMOS transistor MP12 and the NMOS transistor MN12, which are connected in series between the transmission line TL and the ground voltage VSS. A common drain node of the PMOS transistor MP12 and the NMOS transistor MN12 is connected to a gate of the NMOS transistor MN2 which is connected between the transmission line TL and the ground voltage VSS.

In the first driving unit 10, the up driver UPDt carries out the on-chip termination when data is inputted, and is implemented with PMOS transistors MP5, MP6 and MP15 and an NMOS transistor MN15. The up driving control signal PDT is connected through an inverter INV5 to a gate of the PMOS transistor MP5 which is connected between the power supply voltage VDD and the transmission line TL. Also, the up driving control signal PDT is commonly connected to gates of the PMOS transistor MP15 and the NMOS transistor MN15, which are connected in series between the power supply voltage VDD and the transmission line TL. A common drain node of the PMOS transistor MP15 and the NMOS transistor MN15 is connected to a gate of the PMOS transistor MP6 which is connected between the power supply voltage VDD and the transmission line TL. The down driver DNDt is implemented with a PMOS transistor MP16 and NMOS transistors MN5, MN6 and MN16. The down driving control signal NDT is connected through an inverter INV7 to a gate of the NMOS transistor MN5 which is connected between the transmission line TL and the ground voltage VSS. Also, the down driving control signal NDT is commonly connected to gates of the PMOS transistor MP16 and the NMOS transistor MN16, which are connected in series between the transmission line TL and the ground voltage VSS. A common drain node of the PMOS transistor MP16 and the NMOS transistor MN16 is connected to a gate of the NMOS transistor MN6 which is connected between the transmission line TL and the ground voltage VSS.

In the second driving unit 20, the up driver UPC is implemented with PMOS transistors MP3, MP4 and MP13 and an NMOS transistor MN13. The up driving control signal PC1 is connected through an inverter INV2 to a gate of the PMOS transistor MP3 which is connected between the power supply voltage VDD and the transmission line TL. Also, the up driving control signal PC1 is commonly connected to gates of the PMOS transistor MP13 and the NMOS transistor MN13, which are connected in series between the power supply voltage VDD and the transmission line TL. A common drain node of the PMOS transistor MP13 and the NMOS transistor MN13 is connected to a gate of the PMOS transistor MP4 which is connected between the power supply voltage VDD and the transmission line TL. The down driver DNC is implemented with a PMOS transistor MP14 and NMOS transistors MN3, MN4 and MN14. The down driving control signal NC1 is connected through an inverter INV3 to a gate of the NMOS transistor MN3 which is connected between the transmission line TL and the ground voltage VSS. Also, the down driving control signal NC1 is commonly connected to gates of the PMOS transistor MP14 and the NMOS transistor MN14, which are connected in series between the transmission line TL and the ground voltage VSS. A common drain node of the PMOS transistor MP14 and the NMOS transistor MN14 is connected to a gate of the NMOS transistor MN4 which is connected between the transmission line TL and the ground voltage VSS.

In the second driving unit 20, the up driver UPCt carries out the on-chip termination when data is received from an external device through the transmission line TL, and is implemented with PMOS transistors MP7, MP8 and MP17 and an NMOS transistor MN17. The up driving control signal PCT1 is connected through an inverter INV6 to a gate of the PMOS transistor MP7 which is connected between the power supply voltage VDD and the transmission line TL. Also, the up driving control signal PCT1 is commonly connected to gates of the PMOS transistor MP17 and the NMOS transistor MN17, which are connected in series between the power supply voltage VDD and the transmission line TL. A common drain node of the PMOS transistor MP17 and the NMOS transistor MN17 is connected to a gate of the PMOS transistor MP8 which is connected between the power supply voltage VDD and the transmission line TL. The down driver DNCt is implemented with a PMOS transistor MP18 and NMOS transistors MN7, MN8 and MN18. The down driving control signal NCT1 is connected through an inverter INV8 to a gate of the NMOS transistor MN7 which is connected between the transmission line TL and the ground voltage VSS. Also, the down driving control signal NCT1 is commonly connected to gates of the PMOS transistor MP18 and the NMOS transistor MN18, which are connected in series between the transmission line TL and the ground voltage VSS. A common drain node of the PMOS transistor MP18 and the NMOS transistor MN18 is connected to a gate of the NMOS transistor MN8 which is connected between the transmission line TL and the ground voltage VSS FIGS. 4A to 4D are circuit diagrams of signal generators for generating the up driving control signals PD, PC1, PDT and PCT1, respectively, of FIG. 2 and FIG. 3 in accordance with an embodiment of the present invention. FIGS. 5A to 5D are circuit diagrams of signal generators for generating the down driving control signals ND, NC1, NDT and NCT1, respectively, of FIG. 2 and FIG. 3 in accordance with an embodiment of the present invention. When data "1" or "0" is inputted/outputted from/to the exterior of the integrated circuit via the transmission line TL, the driving control signals are used to control the up drivers and the down drivers, which are contained in the driver 3. The output data signal DO is commonly applied to the signal generators for generating the driving control signals.

Figure 4A:
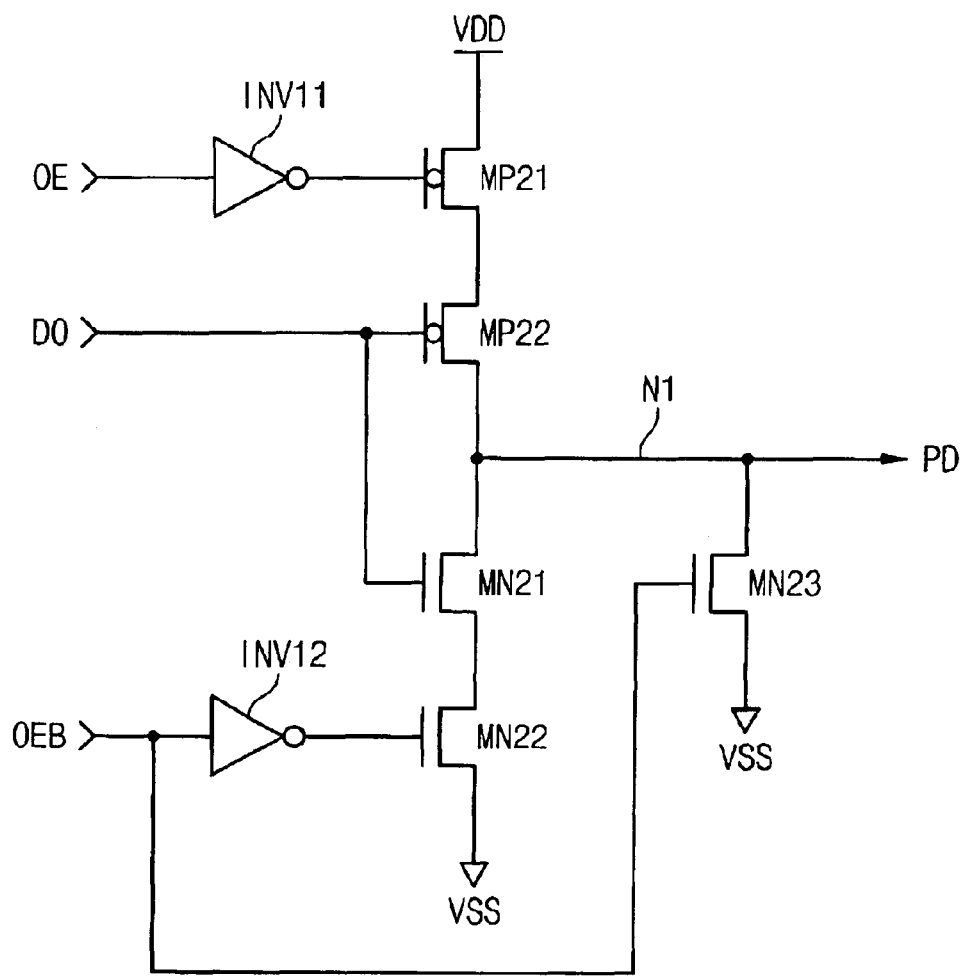
FIGS. 4A to 4D are circuit diagrams of signal generators that generate control signals applied to the up drivers of FIG. 3.

First, referring to FIG. 4A, a PD signal generator for generating the up driving control signal PD of the first driving unit 10 is implemented with PMOS transistors MP21 and MP22 and NMOS transistors MN21 to MN23. The PMOS transistors MP21 and MP22 and the NMOS transistors MN21 and MN22 are connected in series between the power supply voltage VDD and the ground voltage VSS. The up driving control signal PD is outputted at a common drain node N1 of the PMOS transistor MP22 and the NMOS transistor MN21. An output activation signal OE is applied through an inverter INV11 to a gate of the PMOS transistor MP21. The output data signal DO is applied to gates of the PMOS transistor MP22 and the NMOS transistor MN21. A complementary output activation signal OEB (which has a logic state opposite to the output activation signal OE) is applied through an inverter INV12 to a gate of the NMOS transistor MN22. Also, the complementary output activation signal OEB is directly applied to a gate of the NMOS transistor MN23 which is connected between the node N1 and the ground voltage VSS.

When data DO is present, and the output activation signal OE goes to a high level (OEB is opposite and goes to a low level), the signal output at PD is the inverse of the data signal DO applied. For example, if DO is high when OE is high, both NMOS transistors MN21 and MN22 are on and output at PD is pulled-down to VSS.

Figure 4B:
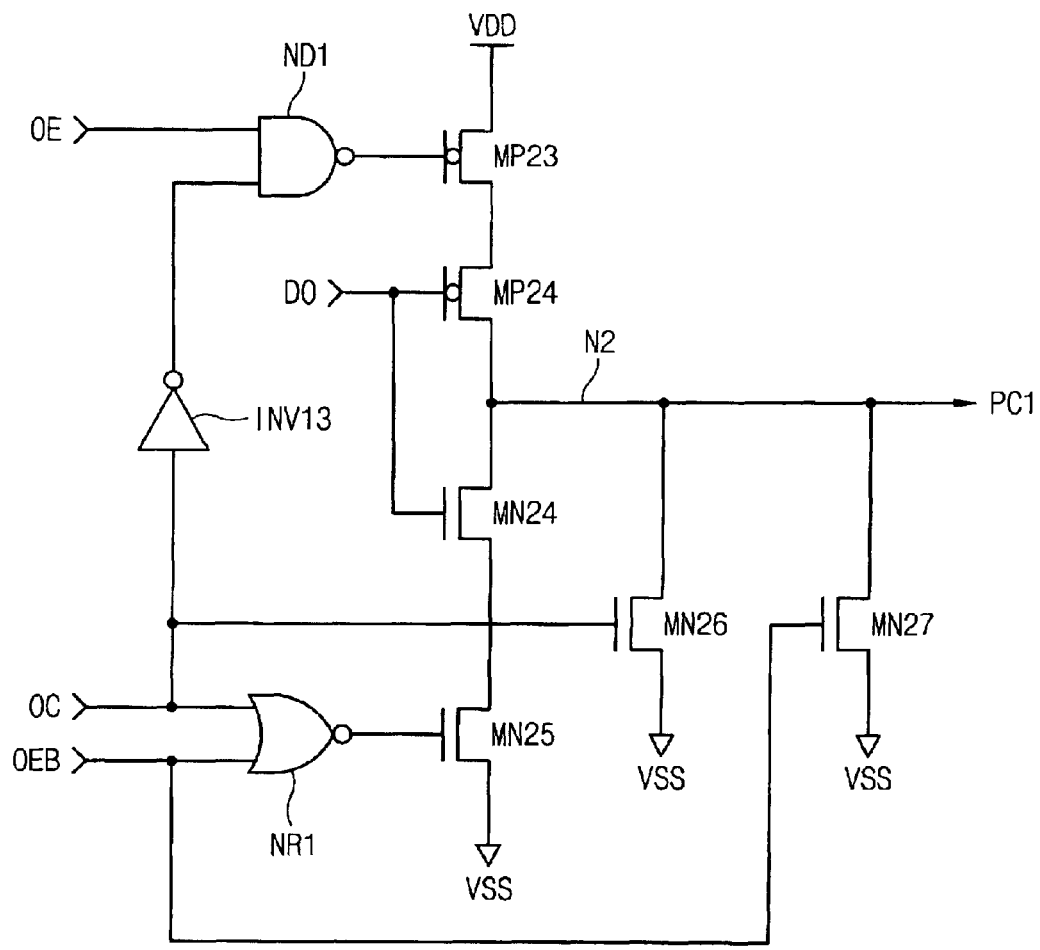

Referring to FIG. 4B, a PC1 signal generator for generating the up driving control signal PC1 of the second driving unit 20 is implemented with PMOS transistors MP23 and MP24 and NMOS transistors MN24 and MN26, which are connected in series between the power supply voltage VDD and the ground voltage VSS. NMOS transistors MN26 and NM27 are connected in parallel between a common drain node N2 of the PMOS and NMOS transistors MP24 and MN24 and the ground voltage VSS. An output of a NAND gate ND1 is connected to a gate of the PMOS transistor MP23. The NAND gate ND1 receives the output activation signal OE and an output of an inverter INV13 receiving an impedance code signal OC. The output data signal DO is applied to gates of the PMOS transistor MP24 and the NMOS transistor MN24. An output of a NOR gate NR1 is applied to a gate of the NMOS transistor MN25. The NOR gate NR1 receives the impedance code signal OC and the complementary output activation signal OEB. Also, the impedance code signal OC is applied to a gate of the NMOS transistor MN26, and the output activation signal OEB is applied to a gate of the NMOS transistor MN27. The up driving control signal PC1 is outputted through the node N2.

The impedance code signal OC is used to activate the second driving unit 20 in case an impedance matching capability is lacking for the transmission line TL when the first driving unit 10 alone is activated. A high level of the impedance code signal OC means that more drivers are not needed and PC1 is pulled-down to VSS even if the output activation signal OE is set to a high level.

Figure 4C:
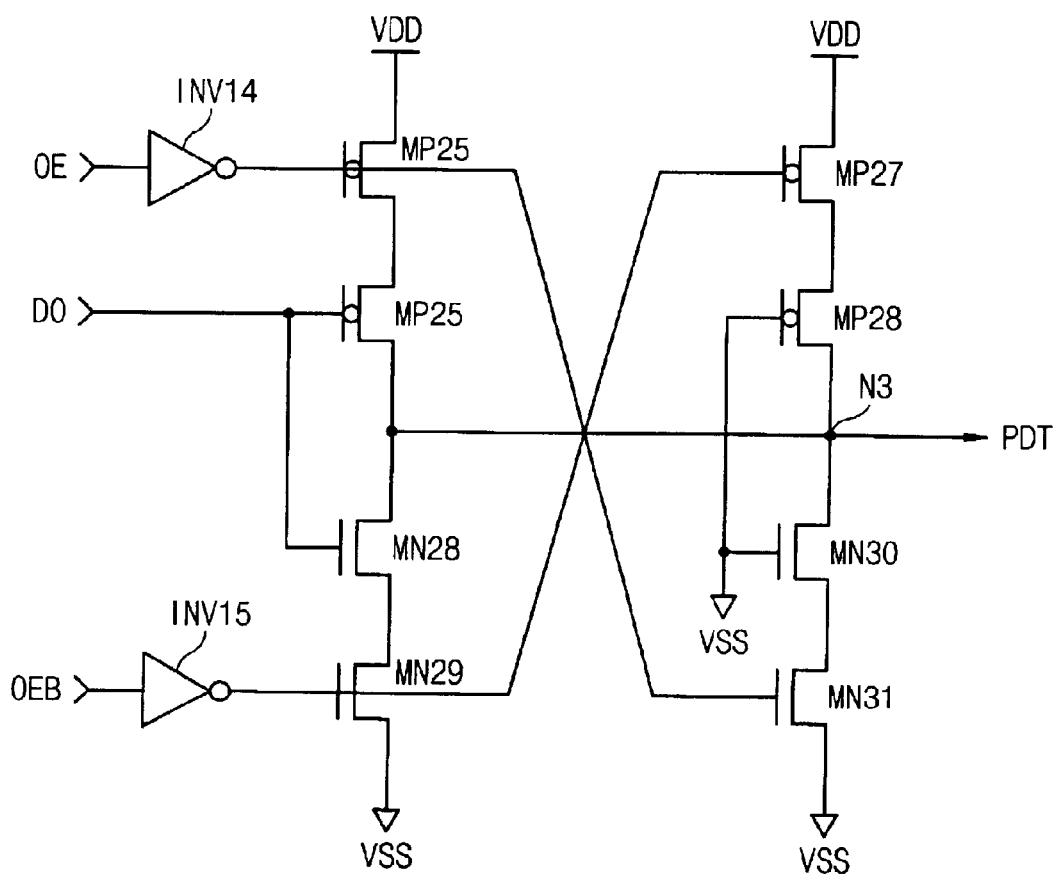

Referring to FIG. 4C, in the PDT signal generator for generating the up driving control signal PDT used for the on-chip termination in the first driving unit 10, PMOS transistors MP25 and MP26 and NMOS transistors MN28 and MN29 are connected in series between the power supply voltage VDD and the ground voltage VSS, and the PMOS transistors MP27 and MP28 and the NMOS transistors MN30 and MN31 are coupled in series between the power supply voltage VDD and the ground voltage VSS. The output activation signal OE is commonly applied through an inverter INV14 to gates of the PMOS transistor MP25 and the NMOS transistor MN31. The complementary output activation signal OEB is commonly applied through an inverter INV15 to gates of the MNOS transistor MN29 and the PMOS transistor MP27. The data output signal DO is commonly applied to gates of the PMOS transistor MP26 and the NMOS transistor MN28. Gates of the PMOS transistor MP28 and the NMOS transistor MN30 are commonly connected to the ground voltage VSS. A node N3 through which the up driving control signal PDT is outputted is connected to a common drain of the PMOS transistor MP26 and the NMOS transistor MN28, and to a common drain of the PMOS transistor MP28 and the NMOS transistor MN30. The PDT signal generator of FIG. 4C performs the on-chip termination when the output activation signal OE is at a low level, and operates in the same manner as the PD signal generator of FIG. 4A when the output activation signal OE is at a high level.

Figure 4D:
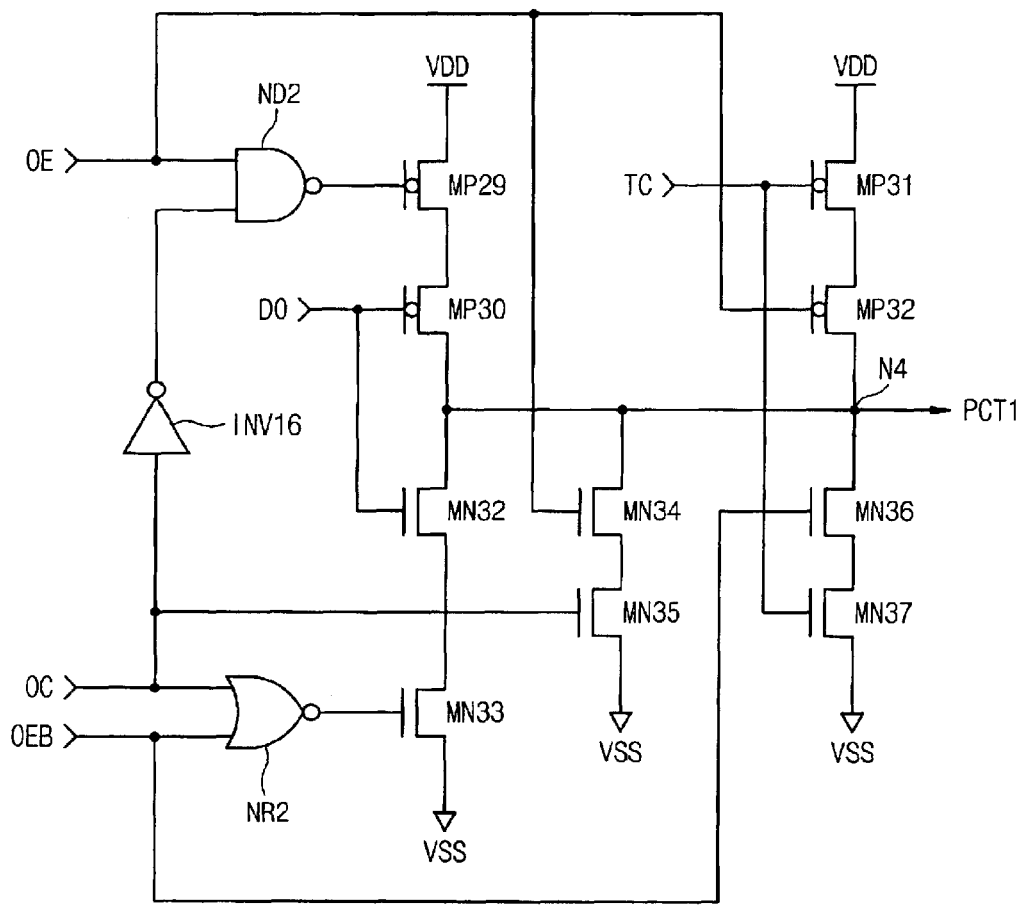

Referring to FIG. 4D, the PCT1 signal generator for generating the up driving control signal PCT1 used for the on-chip termination in the second driving unit 20 includes PMOS transistors MP29 and MP30 and the NMOS transistors MN32 and MN33, which are connected in series between the power supply voltage VDD and the ground voltage VSS. PMOS transistors MP31 and MP32 and the NMOS transistors MN36 and MN37 are connected in series between the power supply voltage VDD and the ground voltage VSS. NMOS transistors MN34 and MN35 are connected in series between a node N4 and the ground voltage VSS, in which the up driving control signal PCT1 is outputted through the node N4. The node N4 is connected to a common drain of the PMOS transistor MP30 and the NMOS transistor MN32, and to a common drain of the PMOS transistor MP32 and the NMOS transistor MN36. The impedance code signal OC is inverted through an inverter INV16, and the output activation signal OE and the inverted impedance code signal are inputted to a NAND gate ND2. An output of the NAND gate ND2 is connected to a gate of the PMOS transistor MP29. Also, the output activation signal OE is connected to gates of the NMOS transistor MN34 and the PMOS transistor MP32. The data output signal DO is commonly applied to gates of the PMOS transistor MP30 and the NMOS transistor MN32. The impedance code signal OC and the complementary output activation signal OEB are inputted into a NOR gate NR2 and an output of the NOR gate NR2 is connected to a gate of the NMOS transistor MN33. Also, the impedance code signal OC is applied to a gate of the NMOS transistor MN35, and the complementary output activation is applied to a gate of the NMOS transistor MN36.

Meanwhile, an impedance code signal TC for the on-chip termination is applied to gates of the PMOS transistor MP31 and the NMOS transistor MN37. The PCT1 signal generator of FIG. 4D performs the on-chip termination when the output activation signal OE is at a low level (in other words, when data is not outputted or data is received).

Accordingly, to compensate for the impedance of the up driver UPDt of the first driving unit 10, the impedance code signal TC is provided to drive the up driver UPCt of the second driving unit 20. In case the impedance of the first driving unit 10 is lacking when the output activation signal OE is in a low level state, the impedance code signal TC goes to a low level to thereby set the up driving control signal PCT1 to a high level. Since a high level of the impedance code signal TC means that the up driver UPCt need not be driven, the up driving control signal PCT1 goes to a low level to thereby turn on the up driver UPCt.

FIGS. 5A to 5D are circuit diagrams of signal generators for generating the down driving control signals ND, NC1, NDT and NCT1 used to control the down drivers DND, DNC, DNDt and DNCt of FIG. 3. In the circuits of FIGS. 5A to 5D, the same elements as those of FIGS. 4A to 4D are denoted by the same reference symbols.

Figure 5A:
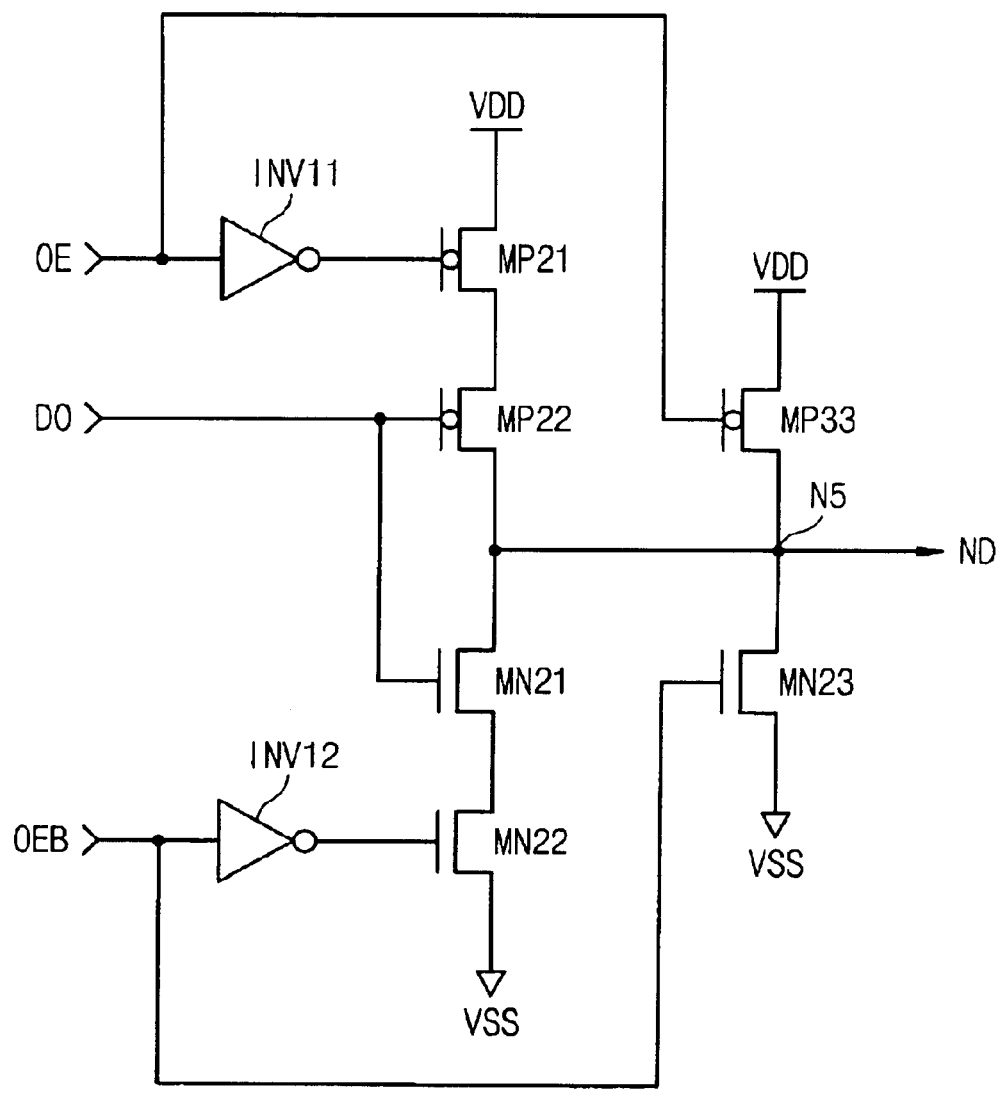
FIGS. 5A to 5D are circuit diagrams of signal generators that generate control signals applied to the down drivers of FIG. 3.

In FIG. 5A, there is shown the ND signal generator for generating the down driving control signal ND used to control the down driver DND of the first driving unit 10. Referring to FIG. 5A, a PMOS transistor MP33 is further added (as compared to the PD signal generator of FIG. 4A) by connection between the power supply voltage VDD and a node N5 through which the down driving control signal ND is outputted. The node N5 is commonly connected to the common drain of the PMOS transistor MP22 and the NMOS transistor MN21.

Figure 5B:
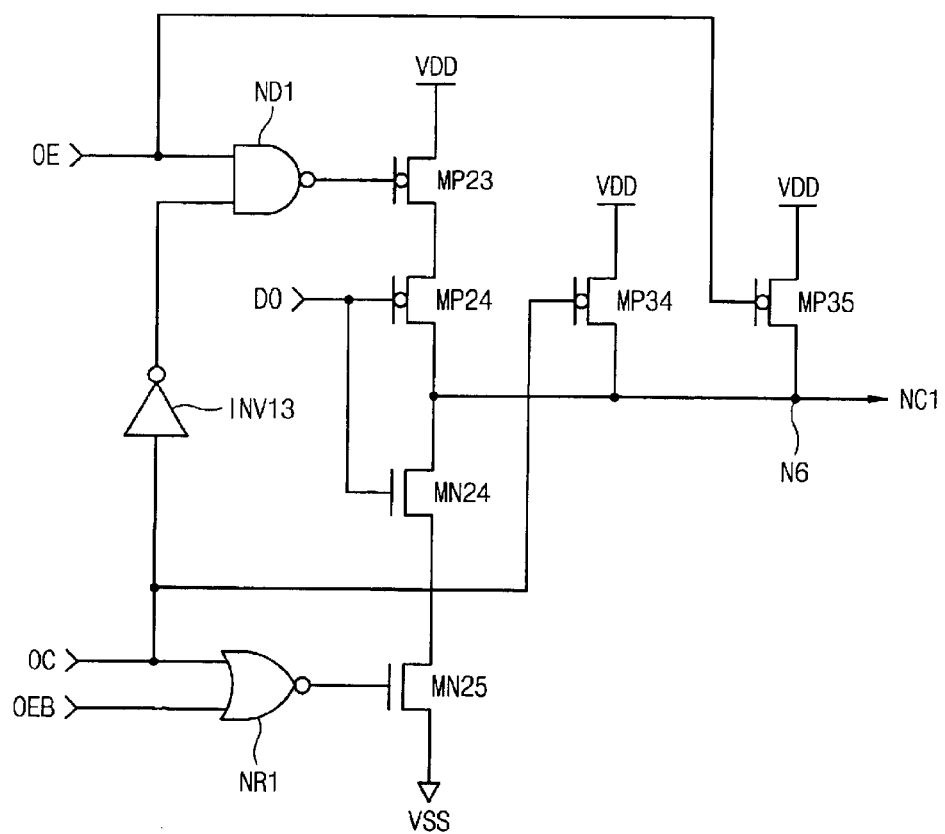

In FIG. 5B, there is shown the NC1 signal generator for generating the down driving control signal NC1 used to control the down driver DNC of the second driving unit 20. Referring to FIG. 5B, the NC1 signal generator includes PMOS transistors MP34 and MP35 instead of the NMOS transistors MN26 and MN27 of FIG. 4B, and the PMOS transistor MP34 and MP35 are connected in parallel between the power supply voltage VDD and a node N6 through which the down driving control signal NC1 is outputted. The impedance code signal OC is connected to a gate of the PMOS transistor MP34. The output activation signal OE is connected to a gate of the PMOS transistor MP35.

Figure 5C:
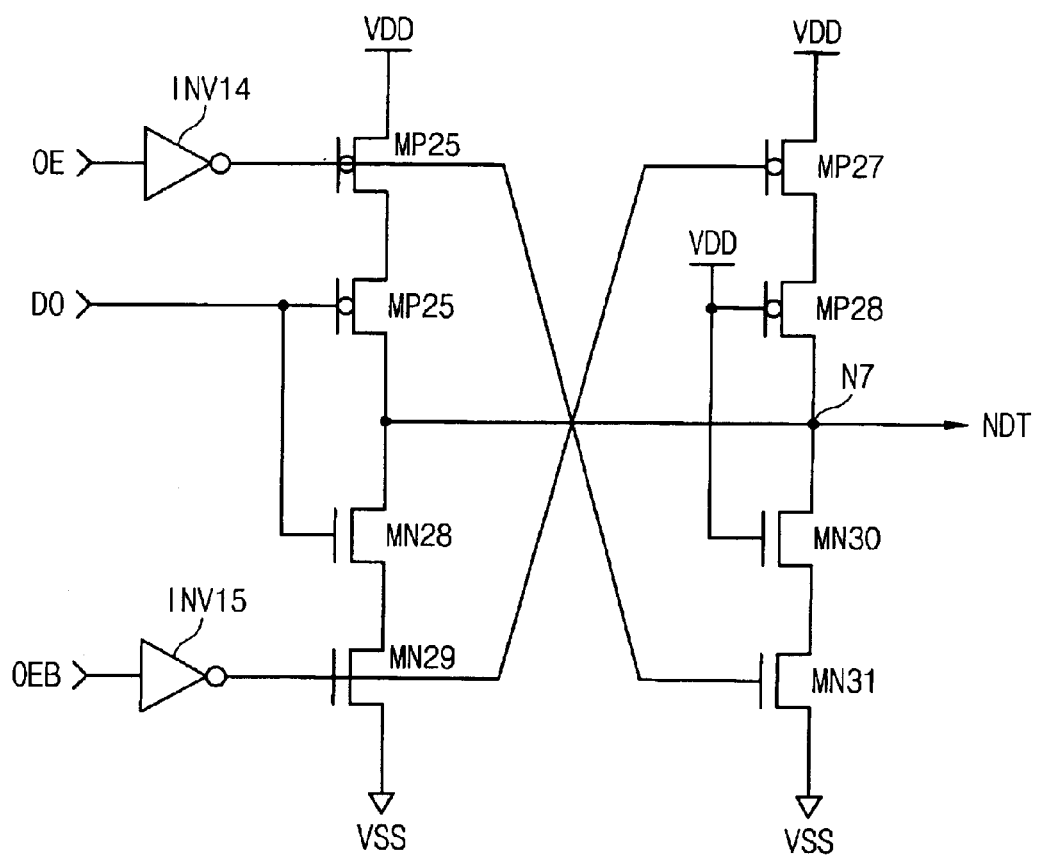

In FIG. 5C, there is shown the NDT signal generator for generating the down driving control signal DNT used to control the down driver DNDt of the first driving unit 10. Referring to FIG. 5C, the NDT signal generator has the PMOS transistor MP28 and the NMOS transistor MN30 whose gates are commonly connected to the power supply voltage VDD (not to the ground voltage VSS as shown in FIG. 4C).

Figure 5D:
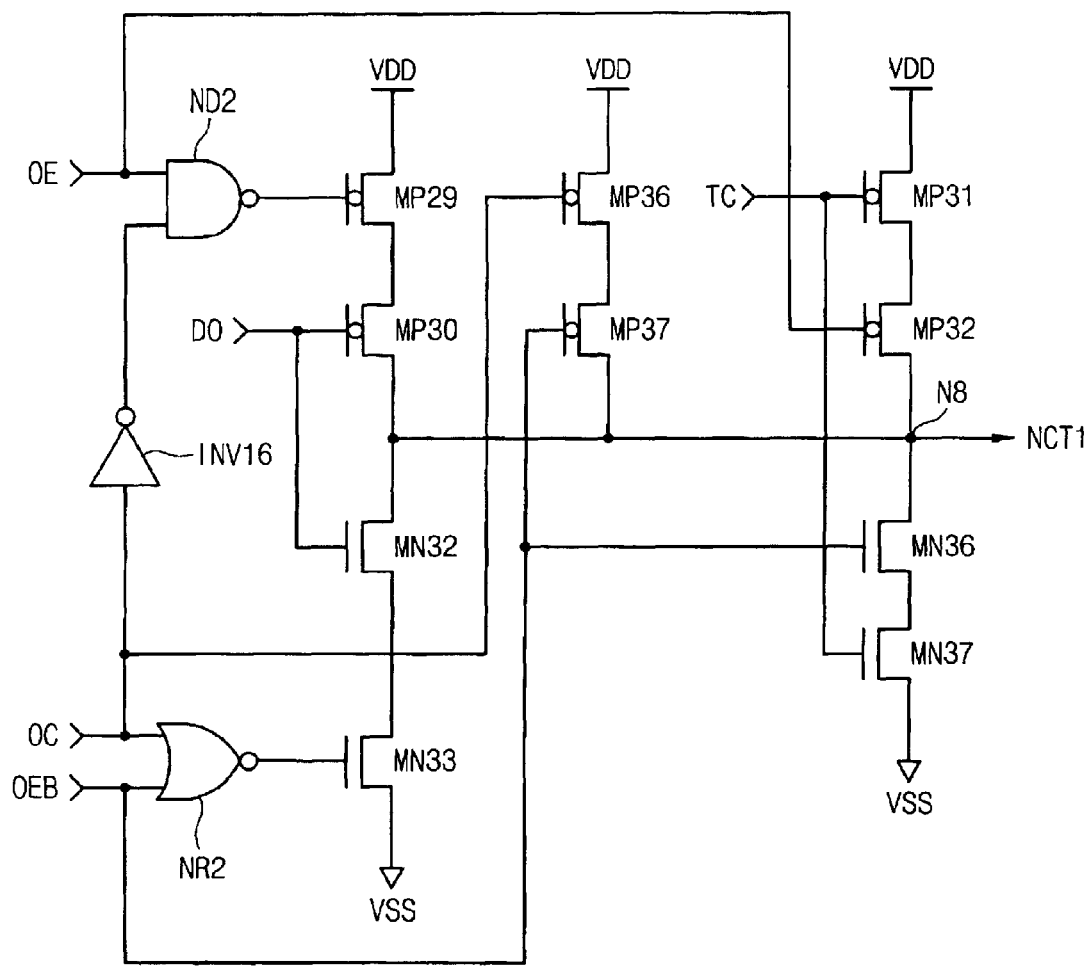

In FIG. 5D, there is shown the NCT1 signal generator for generating the down driving control signal NCT1 used to control the down driver DNCt of the second driving unit 20, in which the down driver DNCt performs the on-chip termination when the output activation signal OE is at a low level. Referring to FIG. 5D, instead of the NMOS transistors MN34 and MN35 of FIG. 4D, PMOS transistors MP36 and MP37 are connected in series between the power supply voltage VDD and a node N8 (N4 of FIG. 4D) through which the down driving control signal PCT1 is outputted. The impedance code signal OC is connected to a gate of the PMOS transistor MP36. The complementary output activation signal OEB is connected to both gates of the PMOS transistor MP36 and the NMOS transistor MN36.

According to an embodiment of the present invention, the driver 3 and the controller 2 constructed as above operate in three operation modes. The first operation mode is the case of outputting the data signal DO of high level (data "1") when the output activation signal OE is at a high level. The second operation mode is the case of outputting the data signal DO of low level (data "0") when the output activation signal OE is at a low level. The third operation mode is the case (the on-chip termination) of receiving a data signal DO into the integrated circuit 1 via the transmission line TL when the output activation signal OE is at a low level. In a following Table 1, the states of the driving control signals are summarized according to the operation modes.

TABLE 1

|  | OUTPUT | | ON-CHIP |
| --- | --- | --- | --- |
|  | DATA "1" | DATA "0" | TERMINATION |
| PD | H | L | L |
| ND | H | L | H |
| PC1 | H | L | L |
| NC1 | H | L | H |
| PDT | H | L | H |
| NDT | H | L | L |
| PCT1 | H | L | H |
| NCT1 | H | L | L |

Figure 6A:
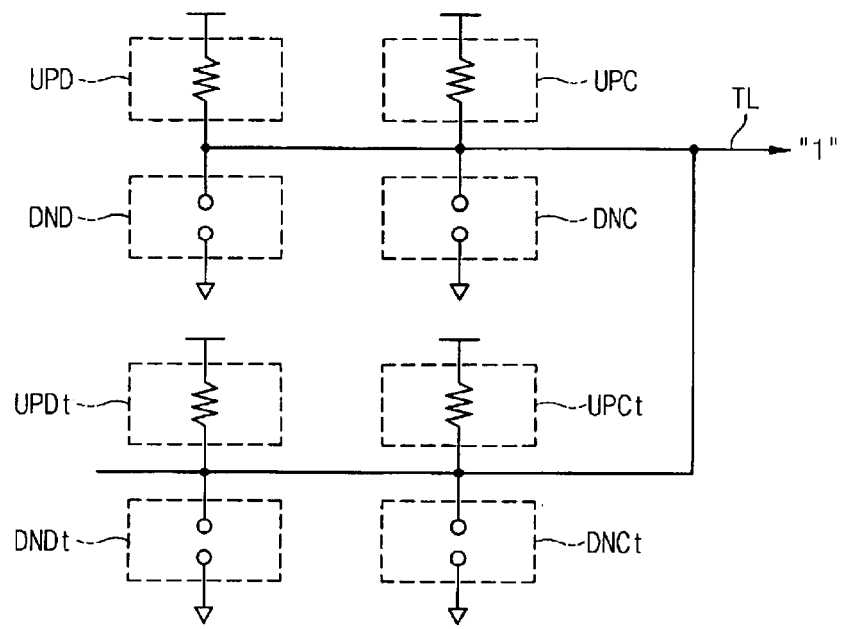
FIGS. 6A to 6C are equivalent circuit diagrams of the driver of FIG. 2 during data input and output operations.
Figure 6B:
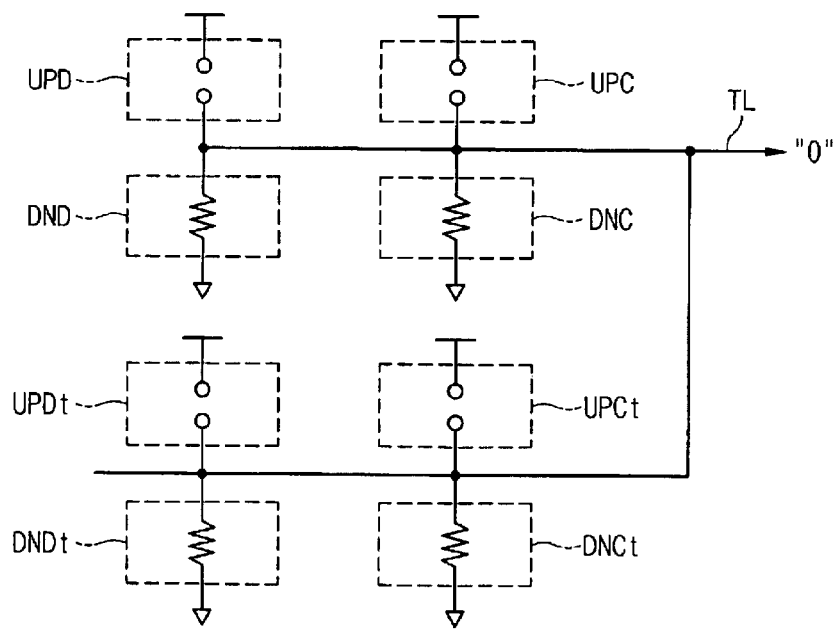
Figure 6C:
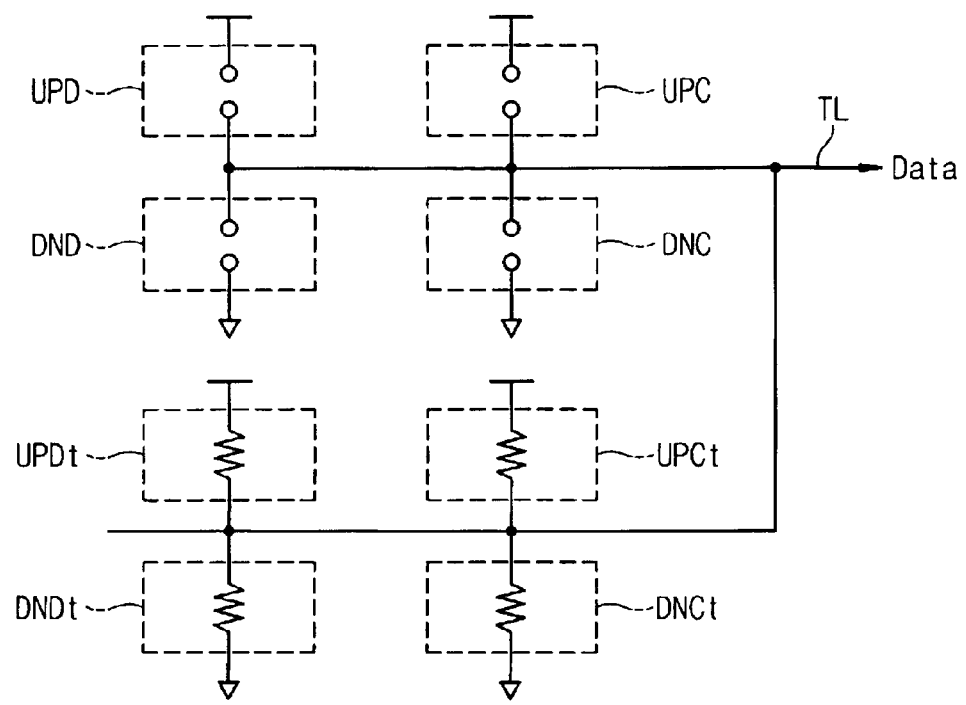

FIGS. 6A to 6C are electrical equivalent states of the operation results of the driver shown in FIG. 3. FIGS. 6A, 6B and 6C are the case of outputting data "1", the case of outputting the data "0", and the case of performing the on-chip termination, respectively.

First, referring to FIG. 6A, in case of outputting the data "1", since the output activation signal OE is at a high level and the data signal DO is at a low level (here, the data signal DO is applied in a logic state opposite to data to be actually outputted), all of the driving control signals PD, ND, PC1, NC1, PDT, NDT, PCT1 and NCT1 are generated at high level (H) from the signal generators of FIGS. 4A to 5D. Accordingly, in the first driving unit 10, while the PMOS transistors MP1, MP2, MP5 and MP6 contained in the up drivers UPD and UPDt are turned on in response to the driving control signals PD and PDT of high level, the NMOS transistors MN1, MN2, MN5 and MN6 are turned off in response to the driving control signals ND and NDT of high level. Additionally, in the second driving unit 20, while the PMOS transistors MP3, MP4, MP7 and MP8 contained in the up drivers UPC and UPCt are turned on in response to the driving control signals PC1 and PCT1 of high level, the NMOS transistors MN3, MN4, MN7 and MN8 are turned off in response to the driving control signals NC1 and NCT1 of high level.

As a result, the transmission line TL is electrically connected in parallel through the up drivers UPD, UPC, UPDt and UPCt to the power supply voltage VDD, not the ground voltage VSS, so that the data "1" is outputted, as shown in FIG. 6A.

At this time, both the impedance code signals OC and TC are at low level. However, in case an additional driver is not needed, i.e., in case the impedance matching is possible by using the first driving unit 10 alone to output data "1" to the transmission line TL, the impedance code signals OC and TC of high level are applied to the signal generators (shown in FIGS. 4B, 4D, 5B and 5D, respectively) for generating the driving control signals PC1, PCT1, NC1, and NCT1 of the second driving unit 20, so that the driving control signals PC1, PCT1, NC1 and NCT1 are not generated. Therefore, the second driving unit 20 does not operate.

In case of outputting the data "0", since the output activation signal OE is at a high level and the data signal DO is at a high level, all of the driving control signals PD, ND, PC1, NC1, PDT, NDT, PCT1 and NCT1 are generated at low level (L) from the circuits of FIGS. 4A to 5D, as shown in Table 1. Accordingly, in the first driving unit 10, while the PMOS transistors MP1, MP2, MP5 and MP6 contained in the up drivers UPD and UPDt are turned off in response to the driving control signals PD and PDT of low level, the NMOS transistors MN1, MN2, MN5 and MN6 are turned on in response to the driving control signals ND and NDT of low level. Additionally, in the second driving unit 20, while the PMOS transistors MP3, MP4, MP7 and MP8 contained in the up drivers UPC and UPCt are turned off in response to the driving control signals PC1 and PCT1 of low level, the NMOS transistors MN3, MN4, MN7 and MN8 are turned on in response to the driving control signals NC1 and NCT1 of low level.

As a result, the transmission line TL is electrically connected in parallel through the down drivers DND, DNC, DNDt and DNCt to the ground voltage VSS, not the power supply voltage VDD, so that the data "0" is outputted, as shown in FIG. 6B.

At this time, both the impedance code signals OC and TC are at high level. However, in case an additional driver is not needed, i.e., in case the impedance matching is possible by using the first driving unit 10 alone to output data "0" to the transmission line TL, the impedance code signals OC and TC of high level are applied to the signal generators (shown in FIGS. 4B, 4D, 5B and 5D, respectively) for generating the driving control signals PC1, PCT1, NC1, and NCT1 of the second driving unit 20, so that the driving control signals PC1, PCT1, NC1, and NCT1 are not generated. Therefore, the second driving unit 20 does not operate.

Next, in case the output activation signal OE is at a low level, i.e., in case the data is inputted via the transmission line TL, the driving control signals PD, ND, PC1 and NC1 for controlling the drivers UPD, DND, UPC and DNC, which are not functionally contained in the termination circuit 30, are generated at low, high, low and high levels, respectively. Meanwhile, the driving control signals PDT, NDT, PCT1 and NCT1 for controlling the drivers UPDt, DNDt, UPCt and DNCt, which are contained in the termination circuit 30, are generated at high, low, high and low levels, respectively.

As a result, since the PMOS transistors MP1 to MP4 and the NMOS transistors MN1 to MN4 are all turned off, the drivers UPD, DND, UPC and DNC do not operate. Meanwhile, since the PMOS transistors MP5 to MP8 and the NMOS transistors MN5 to MN8 are all turned off, the drivers UPDt, DNDt, UPCt and DNCt contained in the termination circuit 30 are set to operation states. Therefore, as shown in FIG. 6C, the transmission line TL is electrically connected to the power supply voltage VDD and the ground voltage VSS.

Also, in this case, both the impedance code signals OC and TC are at low level. However, in case an additional driver is not needed, i.e., in case the impedance matching is possible by using only the drivers UPDt and DNDt at the data input operation, the impedance code signals OC and TC of high level are applied to the signal generators (shown in FIGS. 4D and 5D, respectively) for generating the driving control signals PCT1 and NCT1 of the second driving unit 20, so that the driving control signals PCT1 and NCT1 are not generated. Therefore, the drivers UPCt and DNCt of the second driving unit 20 do not operate.

It can be seen that the driver 3 of the present invention performs the data output operation using only the first driving unit 10 and also performs the on-chip termination at the data input operation. Additionally, by using the impedance code signals OC and TC, which are provided for the case the impedance with respect to the transmission line TL is lacking for the data output or input operation, the lacking impedance can be compensated. The additional impedance compensating means such as the second driving unit 20 can be further added for impedance matching to the transmission line TL.

As described above, according to an integrated circuit of the present invention, the on-chip termination is added to the driver for inputting/outputting data. Additionally, when the impedance is lacking for the data input/output operations, the lacking impedance can be compensated. Accordingly, the present invention has an advantage that the data input/output characteristics can be effectively managed and improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An integrated circuit connected to a transmission line, the integrated circuit comprising:
   a driver including a plurality of driving units for outputting data to the transmission line and receiving data from the transmission line; and
   a controller for applying a plurality of control signals to the driver, the control signals being generated in response to an output activation signal and at least one impedance code signals related to states of the impedance of the transmission line,
   wherein at least one driving unit is driven in response to the control signals, and the driver includes an on-chip termination circuit for impedance matching external devices,
   wherein the driver includes a first driving unit and a second driving unit commonly connected to the transmission line,
   wherein the controller includes:
   a circuit for generating a first up driving control signal in response to the output activation signal and the output data signal;
   a circuit for generating a second up driving control signal in response to the output activation signal and the output data signal;
   a circuit for generating a first down driving control signal in response to the output activation signal and the output data signal;
   a circuit for generating a second down driving control signal in response to the output activation signal and the output data signal;
   a circuit for generating a third up driving control signal in response to the output activation signal, the output data signal and a first impedance code signal;
   a circuit for generating a fourth up driving control signal in response to the output activation signal, the output data signal, the first impedance code signal and a second impedance code signal;
   a circuit for generating a third down driving control signal in response to the output activation signal, the output data signal and the first impedance code signal; and
   a circuit for generating a fourth down driving control signal in response to the output activation signal, the output data signal, the first impedance code signal and the second impedance code signal.

2. The integrated circuit of claim 1, wherein the first driving unit includes:
- a first up driver for connecting a power supply voltage with the transmission line in response to the first up driving control signal;
- a second up driver for connecting the power supply voltage with the transmission line in response to the second up driving control signal;
- a first down driver for connecting the transmission line with a ground voltage in response to the first down driving control signal; and
- a second down driver for connecting the transmission line with the ground voltage in response to the first down driving control signal.

3. The integrated circuit of claim 2, wherein the first up driver includes at least one PMOS transistor, the PMOS transistor connecting the power supply voltage with the transmission line in response to the first up driving control signal.

4. The integrated circuit of claim 2, wherein the second up driver includes at least one PMOS transistor, the PMOS transistor connecting the power supply voltage with the transmission line in response to the second up driving control signal.

5. The integrated circuit of claim 2, wherein the first down driver includes at least one NMOS transistor, the NMOS transistor connecting the transmission line with the ground voltage in response to the first down driving control signal.

6. The integrated circuit of claim 2, wherein the second down driver includes at least one NMOS transistor, the NMOS transistor connecting the transmission line with the ground voltage in response to the second down driving control signal.

7. The integrated circuit of claim 2, wherein the second up driver and the second down driver are contained in the on-chip termination circuit.

8. The integrated circuit of claim 7, wherein the first up driver and the first down driver are selectively driven according to states of the output data signals at a data output operation, and the second up driver and the second down driver are simultaneously driven at a data input operation.

9. The integrated circuit of claim 2, wherein the second driving unit includes:
- a third up driver for connecting the power supply voltage with the transmission line in response to the third up driving control signal;
- a fourth up driver for connecting the power supply voltage with the transmission line in response to the fourth up driving control signal;
- a third down driver for connecting the transmission line and the ground voltage in response to the third down driving control signal; and a fourth down driver for connecting the transmission line with the ground voltage in response to the fourth down driving control signal.

10. The integrated circuit of claim 9, wherein the third up driver includes at least one PMOS transistor, the PMOS transistor connecting the power supply voltage with the transmission line in response to the third up driving control signal.

11. The integrated circuit of claim 9, wherein the fourth up driver includes at least one PMOS transistor, the PMOS transistor connecting the power supply voltage with the transmission line in response to the fourth up driving control signal.

12. The integrated circuit of claim 9, wherein the third down driver includes at least one NMOS transistor, the NMOS transistor connecting the transmission line with the ground voltage in response to the third down driving control signal.

13. The integrated circuit of claim 9, wherein the fourth down driver includes at least one NMOS transistor, the NMOS transistor connecting the transmission line with the ground voltage in response to the fourth down driving control signal.

14. The integrated circuit of claim 9, wherein the fourth up driver and the fourth down driver are contained in the on-chip termination circuit.

15. The integrated circuit of claim 14, wherein the third up driver and the third down driver are selectively driven simultaneously together with the first up driver and the first down driver according to kinds of the output data signals at the data output operation, and the fourth up driver and the fourth down driver are driven simultaneously together with the second up driver and the second down driver at the data input operation.

16. An integrated circuit for inputting/outputting data through a transmission line, the integrated circuit comprising:
- a circuit for generating a first up driving control signal from an output data signal in response to an output activation signal;
- a circuit for generating a first down driving control signal from the output data signal in response to the output activation signal;
- a circuit for generating a second up driving control signal from the output data signal in response to the output activation signal;
- a circuit for generating a second down driving control signal from the output data signal in response to the output activation signal;
- first PMOS transistor circuit for connecting a power supply voltage with the transmission line in response to the first up driving control signal;
- first NMOS transistor circuit for connecting the transmission line with a ground voltage in response to the first down driving control signal;
- second PMOS transistor circuit for connecting the power supply voltage with the transmission line in response to the second up driving control signal; and
- second NMOS transistor circuit for connecting the transmission line with the ground voltage in response to the second down driving control signal,
- wherein the first and second PMOS transistor circuits and the first and second NMOS transistor circuits are selectively driven in response to the first and second up driving control signals and the first and second down driving control signals according to states of the output data signals at the data output operation, and the second PMOS transistor circuit and the second NMOS transistor circuit are simultaneously driven at the data input operation;
- a circuit for inputting the output data signal and generating a third up driving control signal in response to the output activation signal and a first code signal related to the impedance;
- a circuit for inputting the output data signal and generating a third down driving control signal in response to the output activation signal and the first code signal related to the impedance;
- a circuit for inputting the output data signal and generating a fourth up driving control signal in response to the output activation signal, the first code signal and a second code signal related to the impedance;

a circuit for inputting the output data signal and generating a fourth down driving control signal in response to the output activation signal and the first and second code signals;

third PMOS transistor circuit for connecting the power supply voltage with the transmission line in response to the third up driving control signal;

third NMOS transistor circuit for connecting the transmission line with the ground voltage in response to the third down driving control signal;

fourth PMOS transistor circuit for connecting the power supply voltage with the transmission line in response to the fourth up driving control signal; and fourth NMOS transistor circuit for connecting the transmission line with the ground voltage in response to the fourth down driving control signal, wherein the PMOS transistor circuits and the NMOS transistor circuits are selectively driven according to states of the output data signals at the data output operation, and the second and fourth PMOS transistor circuits and the second and fourth NMOS transistor circuits are simultaneously driven at the data input operation.

17. A method for matching impedance for an integrated circuit connected to a transmission line, comprising:

generating a first up driving control signal from an output data signal in response to an output activation signal;

generating a first down driving control signal from the output data signal in response to the output activation signal;

generating a second up driving control signal from the output data signal in response to the output activation signal;

generating a second down driving control signal from the output data signal in response to the output activation signal;

connecting a power supply voltage with the transmission line in response to the first up driving control signal;

connecting the transmission line with a ground voltage in response to the first down driving control signal;

connecting the power supply voltage with the transmission line in response to the second up driving control signal; and connecting the transmission line with the ground voltage in response to the second down driving control signal, wherein the first and second PMOS transistor circuits and the first and second NMOS transistor circuits are selectively driven in response to the first and second up driving control signals and the first and second down driving control signals according to states of the output data signals at the data output operation, and the second PMOS transistor circuit and the second NMOS transistor circuit are simultaneously driven at the data input operation;

inputting the output data signal and generating a third up driving control signal in response to the output activation signal and a first code signal related to the impedance;

inputting the output data signal and generating a third down driving control signal in response to the output activation signal and the first code signal related to the impedance;

inputting the output data signal and generating a fourth up driving control signal in response to the output activation signal, the first code signal and a second code signal related to the impedance;

inputting the output data signal and generating a fourth down driving control signal in response to the output activation signal and the first and second code signals;

connecting the power supply voltage with the transmission line in response to the third up driving control signal;

connecting the transmission line with the ground voltage in response to the third down driving control signal;

connecting the power supply voltage with the transmission line in response to the fourth up driving control signal; and connecting the transmission line with the ground voltage in response to the fourth down driving control signal, wherein the PMOS transistor circuits and the NMOS transistor circuits are selectively driven according to states of the output data signals at the data output operation, and the second and fourth PMOS transistor circuits and the second and fourth NMOS transistor circuits are simultaneously driven at the data input operation.

* * * * *